United States Patent [19]

Noorlander

[11] 4,136,639
[45] Jan. 30, 1979

[54] VACUUM AND PULSATOR AUTOMATIC SHUTOFF FOR A CLAW

[75] Inventor: Daniel O. Noorlander, Orem, Utah

[73] Assignee: I.B.A. Inc., Millbury, Mass.

[21] Appl. No.: 787,862

[22] Filed: Apr. 15, 1977

[51] Int. Cl.$^2$ .............................................. A01J 5/04
[52] U.S. Cl. .................................................. 119/14.55
[58] Field of Search ............... 119/14.36, 14.37, 14.55, 119/14.54; 137/595

[56] References Cited

U.S. PATENT DOCUMENTS 2,507,969  5/1950  Gascoigne ......................... 119/14.55
3,014,455  12/1961  Olander ............................. 119/14.54

Primary Examiner—Hugh R. Chamblee
Attorney, Agent, or Firm—Charles R. Fay

[57] ABSTRACT

A claw for a milking machine milk receiver into which the milk descends through four inflations, a central vertical tubular assembly removing milk from low point of receiver, a vacuum delivery tube for milk attached with respect to the tubular member above the tank, a shutoff for the vacuum operating automatically upon a simple pulling action or accidental dropping of the claw, and means simultaneously shutting off the pulsator action for the inflations.

10 Claims, 3 Drawing Figures

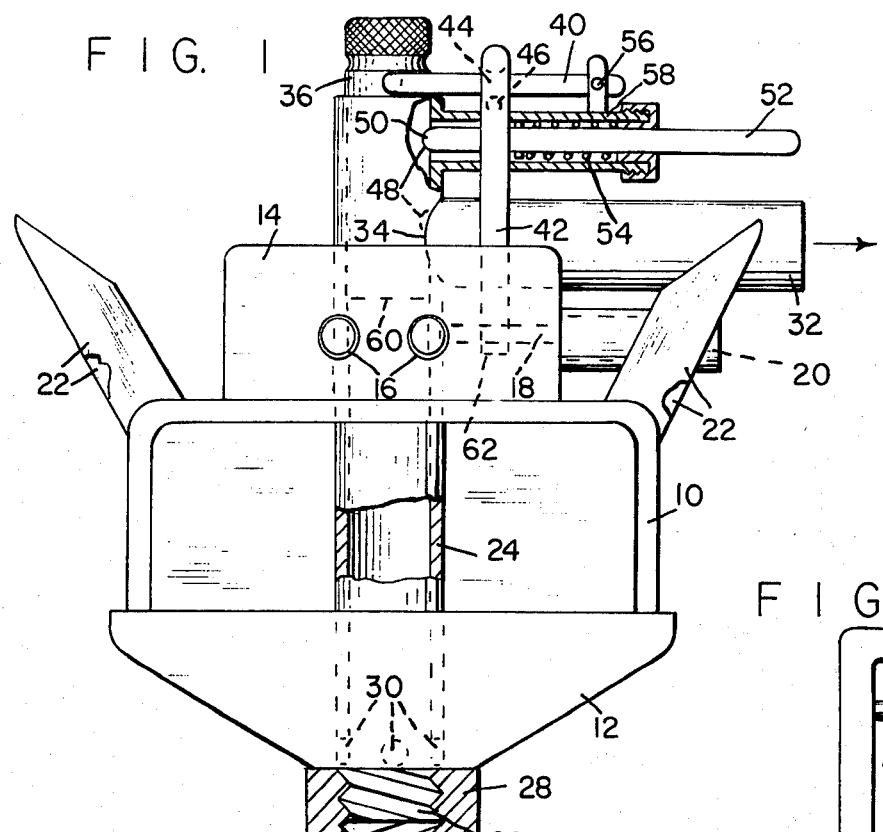
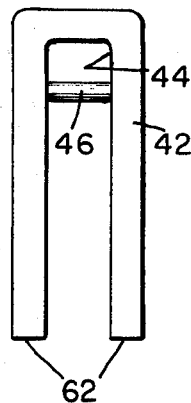
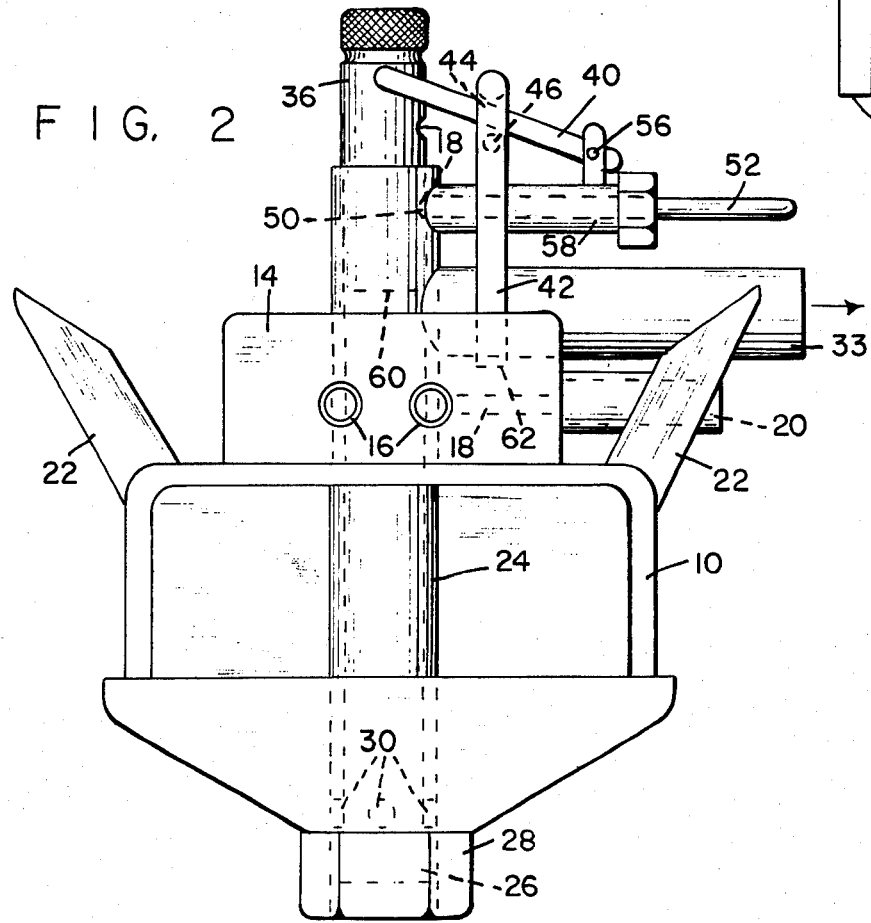

VACUUM AND PULSATOR AUTOMATIC SHUTOFF FOR A CLAW

BACKGROUND OF THE INVENTION

When the prior art machine is not milking, but still operating, as when preparing cows for the next milking, the milking vacuum is usually shut off at the teat cup ferrule on the claw assembly or in the milk hose and this action permits the air from the atmosphere to apply forces to the inflation to satisfy the vacuum on the other side of the inflation. This causes a ballooning action on the inflation that prematurely wears it due to the excessive stress.

The amount of air admitted inside a teat cup assembly to permit pulsation varies from about two to three cubic feet of air per minute depending upon the rate of pulsation and the capacity of the air chamber between the inflation and the shell. The total air consumed unnecessarily by the shell when the machine is not milking also depends upon the number of units in the barn and the number of units used per man, but it normally may be anticipated that the average milking machine will consume two or three feet of cubic air per minute within the teat cup shells. If this pulsating air were to be shut off, it would increase the total air reserve in the milking system in proportion to the number of units from which the pulsating air is blocked and this would tend to stabilize the vacuum with the milking system and reduce the load on the vacuum pump.

It is also an objective of the present invention to provide an improved milk receiving assembly, improving sanitation between cows, and providing an easy and positive means for shutting off the milking vacuum when the machine is removed from the cow or prior to removal, and in combination with a pulsator vacuum shutoff system.

Another object of the invention is to provide a means by which the milking vacuum will also shut off automatically if the machine becomes accidentally disengaged from the cow during milking and would also prevent excess air intake into the milking unit that will increase chances of milk contamination as well as making the vacuum very unstable.

SUMMARY OF THE INVENTION

A milk tank to which the milking inflations are connected may be made as in the prior art, as exemplified by Olander, U.S. Pat. No. 3,014,455 or in two parts for easy assembly and cleaning. In the center thereof it is provided with a vertical tubular member having a screw threaded lower end and milk receiving holes, the screw threads externally receiving a nut for connecting the assembly together with the holes inside the tank. The tube rises through the milk tank and through a part thereof which is connected to the pulsators for the inflations with a connection for vacuum with respect thereto, and there is also a connection for the vacuum which sucks the milk from the milk tank upwardly through the tube to a collection point.

The upper end of the tube is open but can be closed by a plug which is vertically reciprocally mounted therein, this plug blocking off both the vacuum for the milk collection and also for the pulsator when dropped, but is held in an up position by means of a yoke or the like mounted on an upright member locating a spring-pressed pin or rod in a detent in the plug, thereby holding the yoke and the plug in e.g. up position, where both the pulsator and the milk vacuum operate. However merely upon retraction of said spring-pressed pin or rod which is engaged with the plug, the plug drops, as for instance by gravity, and closes both the vacuum and the pulsator ports. The spring pressure may be set to such a degree that should the entire assembly fall from the cow the jar would be sufficient to allow the plug to fall and close the ports.

BRIEF DESCRIPTION OF THE DRAWINGS

FIG. 1 is a view in elevation partly in section illustrating the invention with the plug down and ports closed;

FIG. 2 is a similar view with the plug up and the ports open; and

FIG. 3 is an elevation illustrating the connective yoke for the plug actuator.

PREFERRED EMBODIMENT OF THE INVENTION

The milk tank itself may include two members 10 and 12 which are easily separated for cleaning or assembly and having an appropriate seal at the peripheries thereof. A housing 14 on the tank member 10 connects the pulsator connections 16,16 of which there are four, two only being shown, and these pulsators are serviced by means of a passage 18,20 to a source of energy therefor.

At the upper portion of tank part 10 there are four connections 22,22 for the four inflations, for collecting the milk in the tank.

Holding the parts in assembled relation and having the function of withdrawing the milk from the tank there is an upright tubular member 24 having an external screw threaded lower end at 26 for the application of a nut 28 to hold the parts together. Adjacent its lower end, but in the tank, the tube 24 is provided with a series of holes 30,30 for the entrance of the milk into the tube 24 and exit through a tube 32 under conditions of vacuum, the tube 22 being connected to the tube 24 as at 34 and tube 32 leading to a collection vat.

The upper end of tube 24 is open but closed by a sliding plug 36 which may weighted. This plug may have a knurled upper exposed end for manual manipulation thereof if desired, and it is connected to a plug actuator 40 which is in turn connected to an yoke 42. The yoke 42 has an enclosure 44 encompassing actuator 40 and holds it in elevated relation by means of a cross pin 46. The plug 36 has a pair of vertically spaced detents 48 entered into by the nose 50 of the spring pressed pin 52 in its left-handed position, under influence of spring 54, holding the plug down, FIG. 1, or up FIG. 2. The actuator 40 is pivoted at 56 to an extension on a fixed housing 58 for the spring and part of the pin.

With the parts as shown in FIG. 2, spring pressed pin 52 is in the act of holding the weighted plug 36 elevated, so that its lower edge or surface 60 not only clears the connection 34 between the vacuum tube 32 and the upright tube 24, but also the yoke 42 having the lower ends 62 open passage 18. There are two passages 18 in the usual machine. In this condition therefore both the vacuum tube 32 and the pulsator actuator tubes 18 are clear and the pulsator is being actuated as well and the milk is flowing upward through tube 24 and out through the vacuum tube 32. However should the claw fall from the cow for any reason for the pin 52 be retracted to the right, the weight of the plug will then cause the plug to fall and the bottom 60 thereof will be below the opening at 34 so as to block off the vacuum 32, and at the same time the yoke 40 is brought down into its lower position and blocks off the pulsator access tubes 18 thereby automatically closing off the pulsators at the same time.

I claim:

1. A milking machine claw comprising a milk tank, vacuum means connected to the interior portion of said tank for drawing off the milk, a plug having a position closing said vacuum means and a position opening the same, movable means temporarily holding said plug in vacuum clear condition but upon being retracted allowing the plug to move to its position closing off the vacuum to the milk tank, pulsator passage means, and means for opening and closing these passage means with the motion of the plug.

2. The milking machine claw of claim 1 wherein said plug is operable at the top of the tank.

3. A milking machine claw comprising a milk tank, an upright tube therein, a vacuum tube for applying vacuum to said upright tube, withdrawing the milk from the tank to a collection point, a plug in said tube having two positions, one wherein the vacuum is closed and one wherein the vacuum is open, releasable means holding said plug in vacuum open position and means causing the plug to drop upon release of said releasable means to close the vacuum, pulsator passage means for the tank for the application of varying pressures, and means to open and close the passage means simultaneously with the opening and closing of the vacuum.

4. The milking machine claw of claim 3 wherein said plug is gravity operated.

5. The milking machine claw of claim 3 wherein the releasable means includes a spring biassed pin.

6. The milking machine claw of claim 4 wherein the means to open and close the passage means comprises a yoke having a plurality of arms that act to block or clear the passage means.

7. The milking machine claw of claim 6 including means connecting the yoke and the plug for simultaneous operation.

8. The milking machine claw of claim 7 including a housing for the pin, the actuator for the plug being pivoted thereto at one end thereof.

9. The milking machine claw of claim 7 wherein the plug is weighted for actuation by gravity, said plug being manually actuatable upwardly.

10. The milking machine claw of claim 3 whereby said plug is manually operated.

* * * * *